United States Patent Office 3,380,907
Patented Apr. 30, 1968

3,380,907
APPARATUS FOR THE ELECTROLYTIC REFINING OF NUCLEAR METALS
Joseph Gerard Wurm, Varese, Italy, assignor to European Atomic Energy Community—Euratom, Brussels, Belgium
Filed Sept. 13, 1963, Ser. No. 308,778
Claims priority, application Germany, Sept. 13, 1962, E 23,520
6 Claims. (Cl. 204—247)

ABSTRACT OF THE DISCLOSURE

The apparatus comprises an electrolysis vessel made of electrically conductive metal, such as copper, and formed as a double-walled internally cooled field concentrator intended to concentrate the energy from a high frequency induction coil, surrounding the apparatus, on the cathode metal. The said metal is placed in a crucible located at the bottom of the vessel and made of refractory material. The said cathode metal and the electrolyte above it are kept in a molten state by this energy. The copper vessel is concentrically mounted in a reaction chamber containing an inert atmosphere. The anode is dipped in the molten salt bath above the crucible. Operating with a salt charge of NaCl, KCl and $UCl_3$, a skull of solid salt mixture is formed on the inner wall of the cooled copper vessel whereby to avoid corrosion of the vessel.

---

This invention relates generally to the electrolytic refining of nuclear metals from salt melts of these metals. Nuclear metals include purely constructional metals such as Zr, Nb and Be as well as fissionable or fertile metals such as U, Th and Pu. They are present in the melt in the form of their halogen salts.

A special manner of refining metals consists in obtaining the metal out a solid electrode which is electrically connected as the anode and consists of the unpurified metal. The deposit electrode is then the cathode which consists of the pure metal or is at least coated therewith. The salt bath acts as a normal electrolyte. Since there is electrically no natural potential difference between the electrodes, the electrolytic process must be set into action by an external voltage source. The pure metal travels to the cathode and the impurities go into the salt melt.

The invention is particularly directed to an advantageous embodiment and development of the above described type of electrolytic refining.

The refining with pure and impure electrodes applies with particular advantage to metals such as uranium or plutonium. It can be used either for producing pure uranium from the halogenated impure carbide or oxide, or for the preparation of irradiated fuel elements with the fission products as impurities.

The salt melt electrolysis presents a series of operational problems. From the viewpoint of chemical technology these include protection of the salt melt from oxidation and absorption of moisture, protection of the electrolysis vessel against the corrosive attack of the melt, and the formation of dendrites at the cathode upon deposit of the separated metal. From the constructional viewpoint they include heating of the electrodes and accessibility of the apparatus.

A whole series of separate measures have been proposed for the solution of these problems. Constant spraying of the melt bath with inert protective gas is to prevent oxidation of the melt. Electrolysis vessels of graphite are not subject to corrosion by the salt melt. Dendrite formation is got around by liquid cathodes. Heating of the bath by induction saves separate heating furnaces etc. These measures have in part been successful. It is the object of the invention to utilize them, at least in effect, as far as possible together in a refining plant.

A refinery of this type is characterized in accordance with the invention in that the electrolysis vessel, made of electrically conductive metal, is concentrically mounted in the reaction chamber in transformer series with an HF induction winding surrounding the reaction chamber and operated with inert gas, the vessel being formed as a double wall, internally cooled field concentrator known per se and having a radial slot and a central bore, and in that the bore has set therein a melt crucible of refractory material projecting beyond the floor of the electrolyte vessel to form a collar, the crucible having on the floor thereof a layer of pure nuclear metal acting as cathode and a cathodic electrode projecting thereinto, and in that furthermore the anodic electrode (or electrodes) is arranged in the bath zone peripherally to the melt crucible, and in that the reaction chamber, preferably consisting of translucent material, is connected to a high vacuum pump. Through this combination of characteristics it is possible to provide for optimum conditions of operation. Thus uranium was experimentally molten at 1200–1250° C. which was nearly impossible with conventional electrolytic cells and with external heating.

The use of a field concentrator as electrolysis vessel makes possible first of all the concentration of electrical melting energy in the crucible zone, that is the cathode. The internal cooling of the concentrator gives the possibility of cooling the walls of the vessel which are in contact with the salt melt in such a way that a salt skull is formed.

The elemination of the usual furnace with its porous ceramic parts brings with it furthermore the great operational advantage that the apparatus can from the beginning of the operation be completely evacuated, so that any attack of oxygen on the melt and on the nuclear metal is prevented. Subsequent loading of the reaction chamber with inert protective gas ensures protection during operation.

The skull provides ideal protection of the vessel from corrosion without disturbing the transfer of heat energy into the bath. The melt crucible of refractory material (for example BeO or ceramics compounded with BeO) provides a liquid electrode and constitutes at the same time a melting and collecting basin for the separated nuclear metal. The dendrite problem is thereby surmounted. The projecting collar of the melt crucible cooperates with the peripheral arrangement of the anodic electrodes to provide a mechanical separating effect on the impurities.

An embodiment of the refinery according to the invention is illustrated by way of example in the accompanying drawings, in which:

FIG. 1 is a longitudinal section of the apparatus.
FIG. 2 is a detail longitudinal section on an enlarged scale of the electrolysis section, in particular the field concentrator.
FIG. 3 is a cross section of the field concentrator of FIG. 2, and
FIG. 4 is a sectional perspective view of the electrolysis section according to FIG. 2.

In FIG. 1 numeral 10 indicates the electrolysis vessel, which is at the same time the field concentrator, 11 is the HF induction winding (connected to a 1.5 mHz. generator of 5 kw. yield), 12 is the cooling system (water) for the vessel or field concentrator, 13 the melt crucible which contains the cathode terminal, 14 the corresponding connecting electrode, 15 the reaction chamber consti- United States Patent Office 3,380,908
Patented Apr. 30, 1968

3,380,908
EXPLOSION BONDED ELECTRODE
FOR ELECTROLYSIS
Kensuke Ono and Shoji Tojima, Nobeoka-shi, and Minoru Ikeda, Oita-shi, Japan, assignors to Asahi Kasei Kogyo Kabushiki Kaisha, Osaka, Japan, a corporation of Japan
Filed Mar. 16, 1965, Ser. No. 440,140
Claims priority, application Japan, Mar. 23, 1964, 39/15,680; Nov. 10, 1964, 39/63,159; Dec. 16, 1964, 39/70,457
10 Claims. (Cl. 204—290)

ABSTRACT OF THE DISCLOSURE

An electrode for electrolysis comprises a base of corrosion resistant metal having a thin layer of a platinum group metal explosion bonded on one face. A current carrying distributor of conductive metal such as copper is explosion bonded to the opposite face of the base and is enclosed with a protective covering of corrosion resistant metal welded to the base. The protective covering is spaced from the copper conductor and the space may be filled with a low melting point alloy. The electrode may have the form of a plurality of transverse bars connected by at least one longitudinal connecting member.

This invention relates to an electrode for electrolysis which is made by an explosive bonding process, and more particularly to an electrolytic electrode obtained by bonding together a platinum-group metal and a corrosion-resistant metal by explosion and further attaching an electrically conductive member to the composite plate of said both metals.

In this specification, a platinum-group metal means platinum, iridium, rhodium, palladium, or an alloy of any combination of these metals, while a corrosion-resistant metal means acid- and alkali-proof metals such as titanium, zirconium, tantalum, or an alloy substantially composed of any combination of these metals.

Platinum electrodes have so far been in use for electrolysis of peroxide compounds such as perchloric acid salts and persulphate salts and for electrolytic reduction of organic compounds. In addition, platinum electrodes are admitted to be available for electrolysis of alkali chlorides by the mercury method; however the fact that platinum is expensive and hard to work restricts the formation of platinum electrodes, which have not therefore been put to practical use on a large scale. Recently, there have been made many attempts to use platinum electrodes industrially in such a manner as coating of the surface of a corrosion-resistant base metal with platinum so as to raise the rate of utilization of platinum.

One of the proposed methods is the spot welding of platinum onto the surface of a corrosion-resistant metal, but it is difficult for the method to perform over-all platinum coating. In addition, since platinum and the corrosion-resistant metal are bonded together through an alloyed layer as shown in FIGURE 3 of the attached drawing, a disadvantage arises that the cladding layer may separate during electrolytic operation just as in the case of plating. There is also the method of thermal treatment of a platinum-group metal salt in order to deposit platinum on the surface of corrosion-resistant metal, but by this method, it is hard to obtain an electrode which is uniform in thickness and applicable to electrolysis at a high current density.

Further, there was proposed a dip-plating liquor for chemical precipitation of a platinum-group metal; however, this method allows no sufficient deposition of a platinum-group metal on the surface of corrosion-resistant metal.

Since, as described above, it is difficult to perform mechanical or chemical coating of platinum on the surface of a base metal, the employment of electrical plating has been inevitable. However, it is hard even by the electrical plating method to obtain a composite plate made up of a corrosion-resistant metal and a platinum-group metal, both firmly bonded together; hence, there was proposed the process of carrying out a thermal treatment of the composite plate in order to fix an alloy layer composed of both metals, thus attempting to produce firmly bonded electrodes. This method allows the bonding force to become higher than that when the composite plate is left as plated, but it is hard for the method to make the plated composite so rigid as to withstand such mechanical works as shearing and bending, and thus this process lays down a restriction on the formation of electrodes and also has the disadvantage of the occurrence of separation of the alloy layer due to the difference of heat generation and that of hardness. Furthermore, it is difficult for the platinum plating method to increase the thickness of the platinum layer over several microns. In this method the surface of the layer usually becomes rough; hence, it is necessary to repeat plating in order to obtain the thickness which the electrode is required to have (2 to 20 microns).

First noted as a method to remove the above-mentioned defects is the process of coating a platinum-group metal on a corrosion-resistant metal by the explosive bonding method. According to this process, the strong explosive pressure serves to bond both metals together so as to form a wavy interface as shown in FIG. 4 attached to this specification; therefore, the composite plate for electrolysis thus obtained has such advantages as being free from any separation to each element and capable of withstanding mechanical works, and further small in electric resistance because both metals are bonded together through no such alloy layer as is formed in the cases of the plating thermal treating process, the spot welding, and so on (as shown in FIG. 3).

Nevertheless, the conventional explosive bonding process has the drawback that, unless the layer of a platinum-group metal is at least 25 microns or more, preferably above 100 microns, in thickness, explosive bonding itself cannot be put into practice; while the sufficient thickness of a platinum-group metal layer for an electrode is about 10 microns at most, and the thickness above this is too costly and too disadvantageous to use industrially.

The present inventors have made studies to make possible the explosive bonding of an extremely thin layer of pltainum-group metal with a thickness below 100 microns onto a surface of a corrosion-resistant metal, and have solved the problem by attaching a platinum-group metal to a suitable supporting plate and thereafter bonding by explosion the platinum-group metal to a corrosion-resistant metal arranged to face the former. The details of the process are to be referred to the specification of the co-pending application Ser. No. 436,544, filed Mar. 2, 1965.

As a commercially available electrode to be put to practical use, the composite plate for electrolysis thus obtained is required to undergo further inquiry in the respect that a corrosion-resistant base metal is low in electric conductivity (for example, the electric specific resistance of titanium and that of zirconium being 55 micro-ohms$^{-cm.}$ and 47 micro-ohms$^{-cm.}$ respectively, about 30 times that of copper, which is 1.7 micro-ohms$^{-cm.}$) and high in price.

Namely, while, in order to put a platinum-clad electrode to commercially advantageous use, it is necessary to perform electrolytic operation at such a high current density as 50 to 200 amperes per square decimeter, the corrosion-resistant metal as an electric conductor is required to have a cross-section which is 30 times that of copper. This fact not only makes the operation inconvenient but also makes the use of the composite plate extremely uneconomical because the corrosion-resistant metal is expensive. Moreover, a device to obtain a uniform current distribution must be taken into account.

Accordingly, an object of this invention is to provide an electrode for electrolysis which is good in electric conductivity and allows a uniform current distribution.

Another object of this invention is to provide an electrode which is small in volume and capable of accepting a great current without any trouble.

A still other object of this invention is to provide a modification of the electrode that meets the above-described objects.

Other objects of this invention will be apparent from the description below.

The present inventors found that the above-mentioned objects can be attained by the procedure which comprises the explosive bonding of a thin layer of a platinum-group metal which is below 25 microns in thickness with a corrosion-resistant base metal by the method of the co-pending application Ser. No. 436,544, then the explosive bonding of an explosively bondable and highly conductive metal to the surface of the corrosion-resistant metal of the composite plate formed by the first explosive bonding, and the covering of the highly conductive metal with a corrosion resistant metal. As the explosively bondable and highly conductive metals are mentioned copper, iron, aluminum, silver, nickel, chromium, or an alloy of any combination of these metals.

The present invention will be further explained hereunder in connection with the accompanying drawings, in which:

FIG. 1 is a cross-sectional view of an assembly in which a sheet of a platinum-group metal is to be bonded by explosion to a plate of a corrosion-resistant metal;

FIG. 2 is a cross-sectional view of an assembly in which a metal plate plated with a layer of a platinum-group metal is to be bonded by explosion onto a plate of a corrosion-resistant metal;

FIG. 3 is a cross-sectional schematic depiction of a composite metal plate obtained by the thermal treatment of a corrosion-resistant metal plated with a platinum-group metal or by the spot welding of both metals;

FIG. 4 represents a cross-sectional schematic view of a part of a composite plate formed by the explosive bonding process;

FIG. 6 is a cross-sectional view of the electrode taken on the line I—I of FIGURE 5;

FIG. 7 is a cross-sectional view of the electrodes taken on the line II—II of FIGURE 5;

Figure 5:
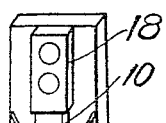
FIG. 5 is an angular perspective view partly in section of a vertical type electrode which is an example of electrodes embodying the present invention.

The reference numerals, common among the figures, indicate the following:

1  A thin cladding layer of a platinum-group metal
2  A plate of a corrosion-resistant metal
3  A binder to adhere the layer 1 to a supporting plate 4
4  A supporting plate
5  Support to hold a space between the sheets 1 and 2
6  A detonating explosive
7  A detonator
7'  Electric wires
8  A foundation
9  An alloy layer
10  An electrically conductive plate of a highly electrically conductive metal
10'  The edges of the electric conductive plate 10
11  A plate (of a corrosion-resistant metal) covering the conductive plate
11'  The edges of the cover plate 11
12  A plate (of a corrosion-resistant metal) covering the conductive plate
13  An electric conductor (e.g. a copper bar)
14  A cylinder of a corrosion-resistant metal covering the conductor 13
15  A space or clearance
16  An alloy low in melting point (e.g. solder)
17  The base portion of the conductive plate 10
18  A terminal
19  Welded portion
20  A wavy interface formed by explosive bonding
22  A plate of a corrosion-resistant metal The process for explosive bonding of a thin plate of a platinum-group metal in the present invention is, for instance, as follows:

As shown in FIG. 1, a thin sheet of platinum-group metal 1 is stuck to a supporting plate 4, for example an iron plate 1.5 mm. of thickness, by means of a binder 3, and then the thin layer of the platinum-group metal is held by supports 5 so as to face a plate of a corrosion-resistant base metal such as titanium, zirconium, or tantalum (hereunder referred to as "a base metal") with a spacing distance $d$ of about one millimeter. Next, almost all of the surface of the supporting plate 4 is covered with plate-shaped explosive 6 or powdery explosive, which is thereafter initiated by means of a detonator 7 attached to one side of the explosive and connected to electric wires 7'. The detonation propels the thin layer of the platinum-group metal 1 toward the surface of the base metal 2 and firmly bonds both metal sheets 1 and 2 together. Thus, an electrode composite composed of the base metal firmly clad with a smooth thin layer of the platinum-group metal is obtained.

Instead of attaching the thin layer of the platinum-group metal 1 to the supporting plate 4 by the above-mentioned means, this bonding process may employ the plating of the supporting plate 4 with the platinum-group metal by making use of the fact that a platinum-group metal deposited by plating is characterized by being weak in bonding force and thus easily separable. Namely, as shown in FIG. 2, it may also be possible to plate the surface of the metallic supporting plate 4 or a non-metallic plate with a thin layer of the platinum-group metal 1 and then to initiate the explosive just as described above so that the thin layer deposited by plating is shifted to the surface of the base metal 2 and bonded firmly onto said surface.

In the composite plate, or electrode plate, obtained by such a process as described above, the boundary surfaces of both metals, for example, platinum and titanium, bonded together by the strong explosive pressure are firmly interlocked so as to form a wavy interface 20 as shown in FIG. 4, unlike those combined by plating-annealing as seen in FIG. 3, and therefore the composite plate formed by the explosive bonding process has the following characteristics:

(1) Even such a metal as titanium which, when placed in the air, immediately forms the oxide film that prevents the cladding metal from being firmly bonded to the base metal, is easily bondable, and the bonded composite is strong in bonding force and hard to separate. If a partial separation should happen, the separation does not extend any further.

(2) This composite plate withstands such mechanical works as shearing and bending and therefore can be worked in an optional shape, and thus it is possible to make an electrode for electrolysis with an optional construction by using this composite.

(3) The platinum layer of the composite plate seldom separates and so is consumed little, thus prolonging the life of the composite plate as an electrode to a remarkable extent.

Next, the method of formation of the electrically conductive member in this invention will be explained in connection, for example, with a vertical-type electrode. On the plate of the corrosion-resistant metal of the electrode plate obtained as described above is placed, as shown in FIG. 5 to FIG. 7, a forklike plate of a metal 10 which is high in electric conductivity, and a detonating explosive is mounted on the conductive plate 10 substantially along the center lines; then the explosive is initiated by means of a detonator attached to one end of the explosive. Following the detonation, the conductive plate 10 of the metal high in electric conductivity is perfectly bonded to the base metal 2 constituting the electrode plate by the explosive pressure so that both plates are almost complete with each other with a wavy interface 20. (As to this explosive bonding process, refer to the copending application Ser. No. 346,019, and now U.S. Patent No. 3,344,510.) Said conductive plate 10 is connected to a terminal 18 and covered with a plate 11 of a corrosion resistant metal which is formed in a semicircular conduit, and the cover plate 11 is welded to the base metal 2 constituting the electrode plate along the contact line, the weld being indicated by the numeral 19. Thus, the conductive member covered with the plate of the corrosion-resistant metal is formed.

Figure 8:
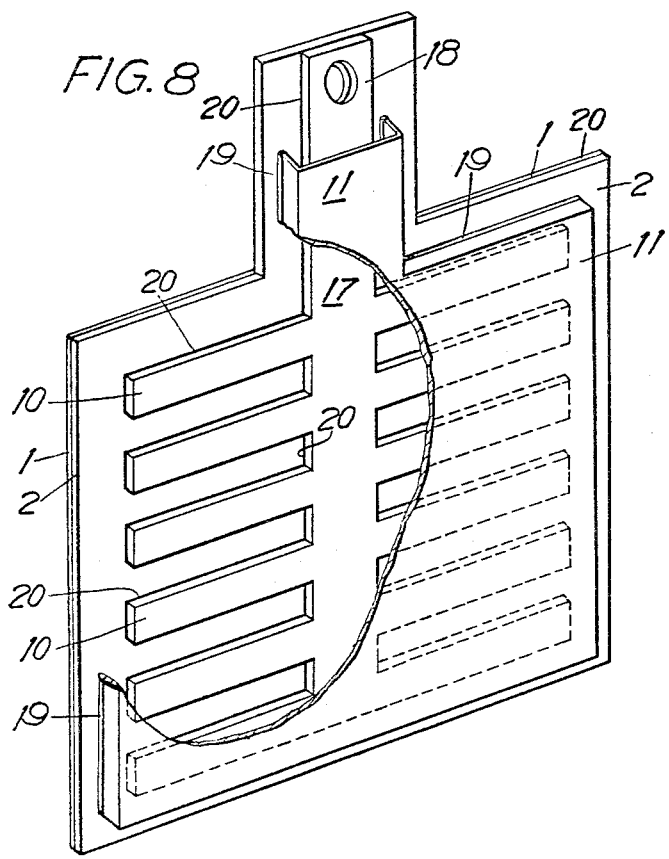
FIG. 8 is an angular perspective view of another example with a part cut off.
Figure 10:
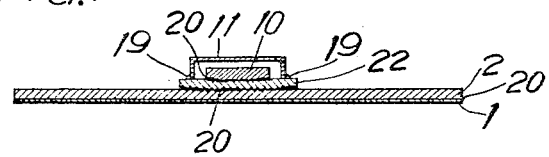
FIG. 10 shows a cross-sectional view of the electrode taken on the line III—III of FIGURE 9.
Figure 9:
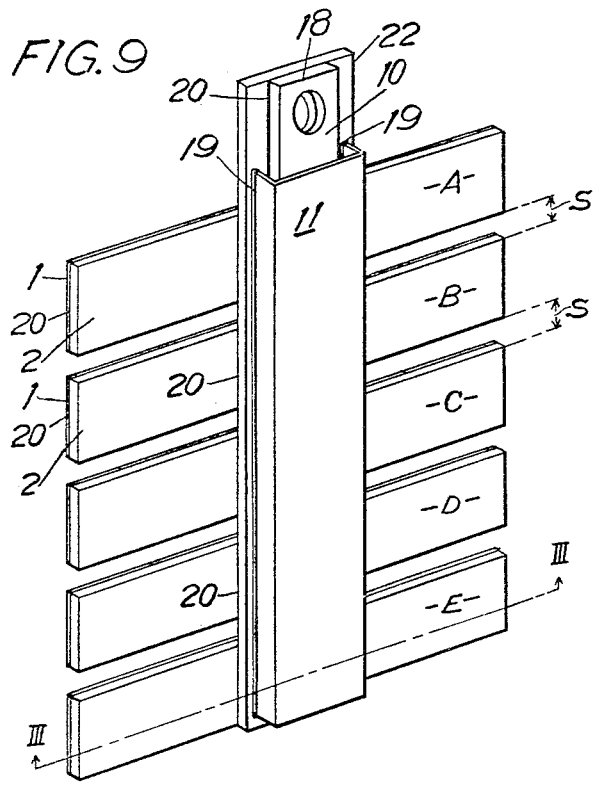
FIG. 9 is an angular perspective view of another example.

It is to be noted that the configuration of the conductive plate 10 consisting of a metal high in electric conductivity and the arrangement of said plate 10 on the base metal 2 can be determined at will according to the purpose of use of the electrode. For example, a reticulate, riblike, or leaf-fibrous arrangement may also be employed. In the case where the arrangement of the conductive member or plate is complicated, it is recommendable to cover the whole surface of the electrode plate with a plate of a corrosion-resistant metal as shown in FIG. 8.

In a case where the conductive plate alone does not provide the cross-section necessary for the specified current, it is possible to pack the space 15 (shown in FIG. 6) between the cover plate 11 of the corrosion-resistant metal and the conductive plate 10 with an alloy low in melting point 16, such as solder, as seen in FIG. 7. In this case, the alloy low in melting point 16 is designed so as not to be attached to the cover plate 11 of the corrosion-resistant metal but to be firmly bonded to the conductive plate 10, so that the low-melting-point alloy 16 also acts as a conductor. The space 15 can be used as a passage for cooling water or heating water as well, and therefore allows the conductive plate 10 to have a sufficient thickness to contribute to the improvement of the current efficiency.

As seen in FIGS. 5 and 7, some portions of the conductive member, such as a, b, and c, are provided on the surface of the base metal 2 at substantially the same intervals, and these portions are assembled at the base portion 17 so that the current fed through the terminal 18 is distributed uniformly over the electrode plate, and thus an efficient and uniform electrolysis is performable.

FIGS. 9 to 13 show three exemplary electrodes each formed with a plurality of electrodes arranged separately. In the case of separate arrangement of many electrode plates, direct bonding of a conductive plate 10 made of a metal which is high in electric conductivity onto base-metal plates 2 constituting the electrode plates is not conformable to the objects of this invention in respect of corrosion-resistability; therefore, it is necessary to provide a plate of a corrosion-resistant metal between the base-metal plates 2 and the conductive plate 10. This is explained in connection with FIGS. 9 and 10. Five (generally an adequate number of) rectangular electrode plates, A, B, C, D and E each composed of a plate of a corrosion-resistant base metal 2 explosively cladded, on one surface, within a thin layer of a platinum-group metal 1, are placed in parallel with one another at suitable intervals S. On the plates of the corrosion-resistant base metal 2 is further mounted at right angles a rectangular metallic plate 22 formed of corrosion-resistant metal, which is then explosively bonded to the base-metal plates 2 as in the preceding example. Next, a narrow conductive plate 10 made of a metal high in electric conductivity is placed on the rectangular plate 22 and bonded thereto by explosion as in the foregoing examples; thus the electrode plates A, B, C, D and E are connected together.

Figure 11:
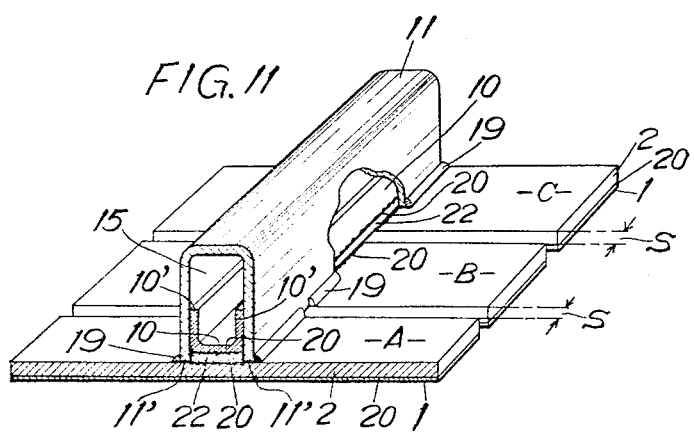
FIG. 11 is an angular perspective view of another exemplary electrode.

The electrode shown in FIG. 11 is similar to that of the preceding example, but the conductive plate 10 has a cross-section in the shape of the letter U, with both of the upright portions represented by the numeral 10'. Namely, three (generally an adequate number of) rectangular electrode plates, A, B, and C, each composed of a plate of a corrosion-resistant base metal 2 explosively bonded, on one surface, with a platinum-group metal are arranged in parallel with one another at appropriate intervals S. On the plates of the base metal 2 is placed at right angles a rectangular metallic plate 22 formed of a corrosion-resistant metal, which is then explosively bonded to the base metal as indicated by the numeral 20. On the metallic plate 22 is further placed the bottom surface of a conductive plate 10 of a metal high in electric conductivity and having a U-shaped cross-section, which is thereafter bonded by explosion as indicated also by 20, with the unbonded marginal portions 10' directed vertically. The metallic plate 22 and the conductive plate 10 thus bonded together are covered with a plate 11 having a U-shaped cross-section, and the edges 11' of the cover plate 11 are welded to the surface of the base metal of each electrode plate.

In this way, the electrode plates A, B, C are fixed at the intervals S by the conductive plate 10 and the cover plate 11 both being common to all of the electrode plates, and thus the current fed through the conductive plate 10 is distributed uniformly. The space 15 defined by the conductive plate 10 and the cover plate 11 may be packed with a metal which is low in melting point or serve as a passage for cooling water or hot water just as in the first example.

Figure 12:
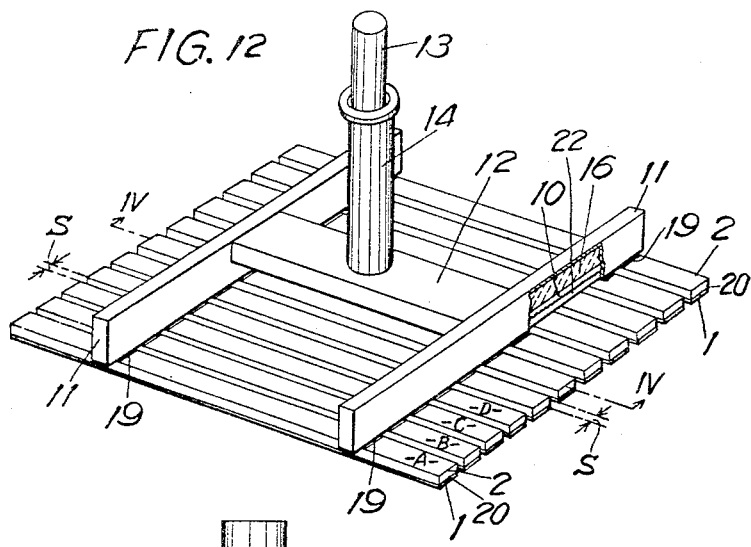
FIG. 12 is an angular perspective view of a horizontal-type electrode.
Figure 13:
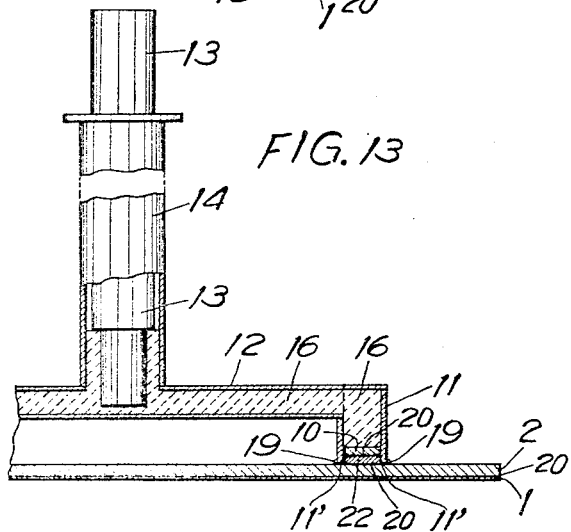
FIG. 13 is a side view in vertical section taken on the line IV—IV of FIG. 12, showing the central portion which includes the conductor fixed to the electrode.

FIGS. 12 and 13 show an exemplary horizontal-type electrode embodying the present invention, and FIG. 13 is a side view in vertical section taken on the line IV—IV, showing the conductor portion of the electrode. A large number of rectangular electrode plates, A, B, C, D . . . each formed by explosive bonding of a thin sheet of a platinum-group metal 1 onto a plate of a corrosion-resistant metal 2, are arranged, base-metal-side up, in parallel with one another at equal intervals S. On the surfaces of the plates of the base metal 2, which are on the side opposite to the layers of the platinum-group metal, are placed at right angles two oblong metallic plates 22 formed of a corrosion-resistant metal, which are then explosively bonded to the base metal, thereby fixing the electrode plates. Further, the surfaces of the metallic plates 22 are explosively cladded with conductive plates 10 made of a metal which is high in electric conductivity. The conductive plates 10 are then covered with plates 11 made of a corrosion-resistant metal and containing an alloy low in melting point 16, and firmly welded to the base metal 2 at the edges 11' in contact with the base metal 2. Between the central spots of the two cover plates 11 fixed in parallel with each other as shown in FIG. 12 is spanned a cover plate 12 made of a corrosion-resistant metal and packed with an alloy having a low melting point 16 just as the cover plates 11 are done. The cover plate 12 is fixed to the cover plates 11 so that the alloy low in melting point contained in the former and that in the latter plates are connected together. Onto the central portion of the cover plate 12 is fixed a cover cylinder 14 formed of a corrosion-resistant metal, and a conductor 13 like a copper bar is put into the cover cylinder 14 and fixed by an alloy with a low melting point 16 which is packed in the cylinder 14 and in close contact with the conductor 13. This conductor is connected to a terminal.

The rectangular electrode plate of this horizontal-type electrode, made by explosive bonding, has the advantage that said plate can be worked to have an adequate shape, and the cross-section may have any of such various forms as the letters V, U, L, and a semicircle, which may be selectively employed according to the conditions and object of the use of the electrode plate. A composite plate made by a usual plating process can not be worked to have any of such shapes as mentioned above, because the work causes separation of the composite plate, thus making the use of the composite impossible; while the electrode of this invention, which is made by explosive bonding, has no such disadvantage and can be put to very effective use.

As evident from the foregoing description, this invention provides an electrode body by explosively bonding a thin sheet or layer of a platinum-group metal onto a surface of a corrosion-resistant base metal plate and further explosively bonding onto the other surface a conductive plate made of a metal which is high in electric conductivity, and thus has an advantage as the cost of production of the electrode can be far lower than that of any prior platinum electrode. In addition, the electrode plate and the conductive plate of copper or the like bonded together by explosion have the surfaces attached to each other firmly and completely in a wavy form, and therefore the electrode is extremely stout and allows the smooth flow and uniform distribution of electric current. Furthermore, as occasions demand, the electrode, which is a heat-generating source in the case of high-oxidation electrolysis, can be so constructed as to be directly cooled to have a high efficiency. Therefore, the industrial utility value of this invention is remarkably great.

What we claim is:

1. An electrode for electrolysis comprising a base of corrosion resistant metal having first and second faces, a thin layer of a platinum-group metal explosion bonded to said first face of said base, current carrying means comprising highly electric conductive metal explosion bonded to said second face of the base and a protective covering of corrosion resistant material enclosing said current carrying means and bonded to said base.

2. An electrode according to claim 1, in which said current carrying means comprises a stem portion and a plurality of branches separately enclosed by said protective covering.

3. An electrode according to claim 1, in which said protective covering is spaced from said current carrying means to provide a space between said current carrying means and said protective covering.

4. An electrode according to claim 3, in which said space between said current carrying means and said protective cover is filled with electrically conductive low melting point metal.

5. An electrode according to claim 1, in which said layer of a platinum-group metal has a uniform thickness less than 100 microns.

6. An electrode according to claim 5, in which said layer of platinum-group metal has a uniform thickness less than 25 microns.

7. An electrode according to claim 1, in which said base comprises a plurality of transverse member and at least one connecting member crossing and explosion bonded to said transverse members.

8. An electrode according to claim 7, in which said current carrying means comprises a conductor extending along and explosion bonded to said connecting member.

9. An electrode according to claim 7, in which said base comprises a plurality of spaced transverse members and a plurality of connecting members crossing and explosion bonded to said transverse members, and in which said current carrying means comprises conductors extending along and explosion bonded to said connecting members.

10. An electrode according to claim 9, in which said current carrying means comprises conducting means connecting said conductors and said protecting covering encloses said conducting means.

References Cited

UNITED STATES PATENTS

| 2,434,731 | 1/1948 | Zu Eltz | 204—286 |
| 3,060,879 | 10/1962 | Staba. | |
| 3,140,539 | 7/1964 | Holtzman. | |
| 3,271,289 | 9/1966 | Messner | 204—286 XR |
| 3,291,714 | 12/1966 | Hall et al. | |
| 3,292,253 | 12/1966 | Rossner et al. | 72—56 |

FOREIGN PATENTS 616,029  3/1961  Canada.

HOWARD S. WILLIAMS, *Primary Examiner.*

D. R. JORDAN, *Assistant Examiner.*